INVENTOR
THOMAS L. EYCHANER
BY Charles J. Johnson
ATTORNEY

United States Patent Office 3,421,046
Patented Jan. 7, 1969

3,421,046
PUSH-PULL ELECTRON BEAM POSITIONING SYSTEM
Thomas L. Eychaner, Minneapolis, Minn., assignor to Sperry Rand Corporation, New York, N.Y., a corporation of Delaware
Filed Sept. 2, 1966, Ser. No. 576,883
U.S. Cl. 315—27        10 Claims
Int. Cl. H01j 29/70

ABSTRACT OF THE DISCLOSURE

An electromagnetic electron beam positioning system which provides extremely linear deflection circuitry for accurate positioning of an electron beam is described. The system includes circuitry utilizing a push-pull yoke in combination with a double-ended deflection circuit arrangement to maintain high operational speed and good position linearity for gross beam positioning. The deflection circuit comprises a plurality of latched current generators, each capable of providing like increments of current, coupled in a stepping counter configuration. The Set output terminals of each of the latched current generators are coupled in common to a first current summing amplifier at one end of the deflection coil, and the Clear terminals are coupled to a second current summing amplitude at the other end of the deflection coil. As the stages of the counter are sequentially Set, additional increments of current are supplied to the first summing amplifier and simultaneously subtracted from the second summing amplifier.

---

Figure 1:
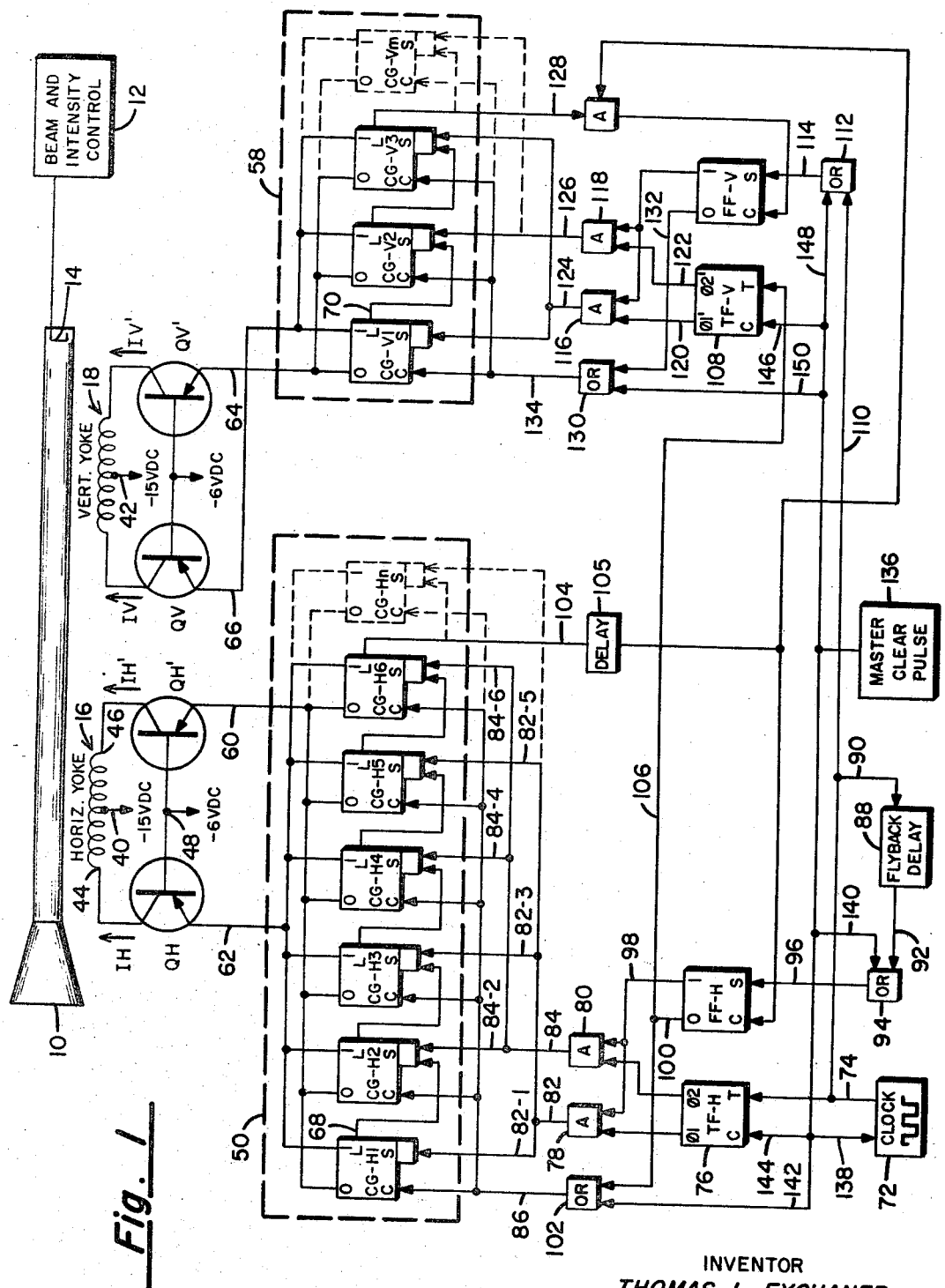

In single-ended electromagnetic beam positioning systems often used in the prior art, the output terminals of a plurality of circuits, which operated in combination to define the beam position, are used to drive a single set of digital-to-analog converters. Such systems have an inherent problem in achieving desired beam-position tolerances due to the build-up of circuit-tolerance deviation as the beam is caused to be moved across the cathode ray tube (CRT). Since precision resistors are used in various combinations to meter the driving currents, it can be seen that shift in values due to aging and the like will materially degrade the beam positioning accuracy.

A true push-pull beam positioning system, as is well-known, has the advantage of improved total deflection system linearity. The subject invention is an improved electromagnetic push-pull beam positioning system, and may find advantageous use, for instance, in commonly assigned copending patent application Serial Number 436,174, filed March 1, 1965. This invention is directed toward providing a circuit arrangement in which units of current can be added to the current flowing in a deflection coil while maintaining a close tolerance on the deviation of total currents after each unit of current is added. By maintaining such close tolerances the deviation in character spacing for each beam position is minimized.

To accomplish the foregoing, this invention utilizes a plurality of latching current generators (CG) coupled in a stepping counter configuratoin. Each of the latching current generators has a logic output terminal for use in gating operations, a Set output terminal (1) for providing a current increment when the stage is Set and a Clear (0) output terminal for providing a current increment when the Stage is Cleared. A Stage that is Set does not provide a current increment on its Clear output terminal, and a Stage that is Cleared does not provide a current increment on its Set output terminal. Each of the Set output terminals are coupled in common to a first current summing amplifier at one end of the deflection coil, and each of the Clear output terminals are coupled in common to a second current summing amplifier at the other end of the deflection coil. The center of the coil is coupled to a reference potential. As the Stages are caused to be sequentially Set, it can be seen that additional increments of current are directed to the first current summing amplifier, while simultaneously increments of current are subtracted from the second current summing amplifier. The net effect of these currents flowing in each half of the deflection coil is to cause a magnetic field which affects the electron beam and causes it to be positioned in one dimension, for instance, along the horizontal. A second beam positioning circuit for positioning along the vertical axis, is similarly constructed and is intercoupled with the horizontal positioning circuitry. The two positioning circuits with the associated control circuitry, operate to define the raster for the CRT, where "raster" is defined as the area on which the image is to be reproduced on the cathode ray tube.

Figure 3:
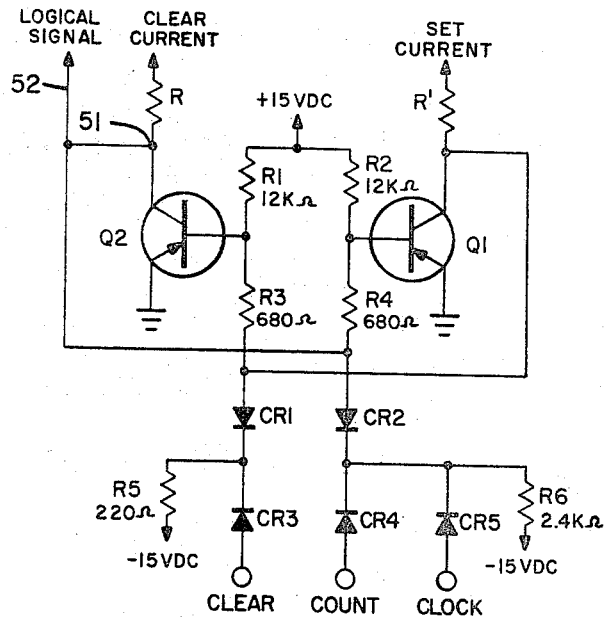
Figure 2:
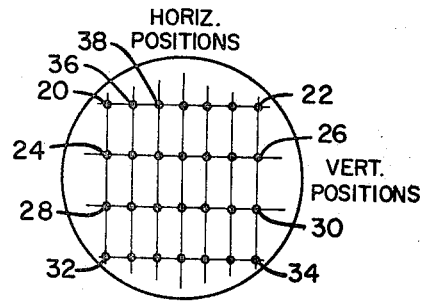
Figure 4:
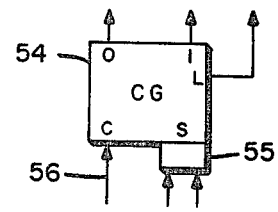
Figure 5:
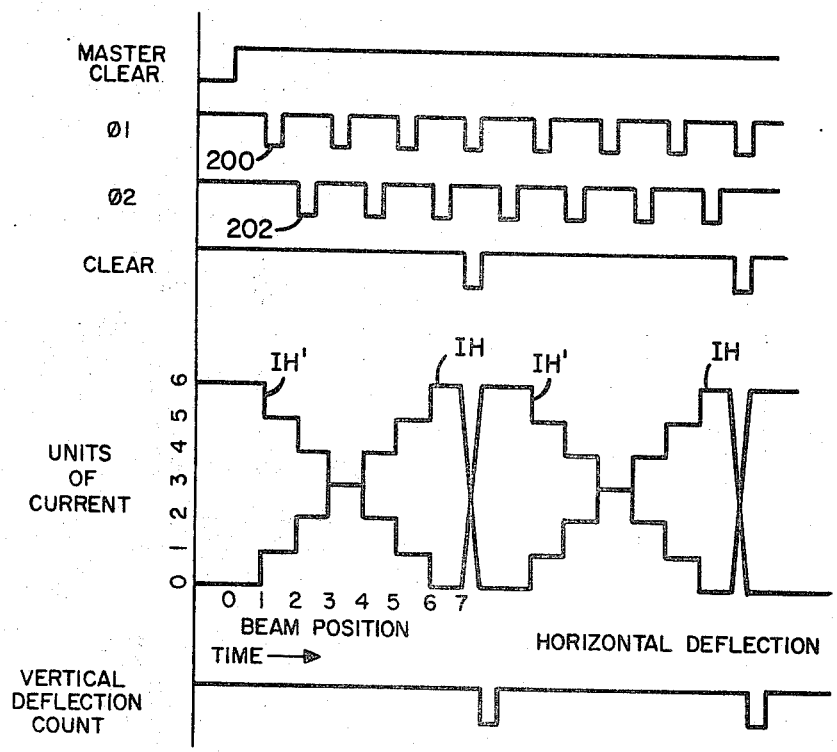

This invention is described in the following paragraphs, which refer to the drawings in which: FIGURE 1 is a logic diagram of the novel electron beam positioning circuitry and includes schematic representation of some of the system elements; FIGURE 2 is an illustrative raster; FIGURE 3 is a schematic diagram of a latched current generating circuit; FIGURE 4 is the logic symbol for the latched current generator; and FIGURE 5 is a timing and current-level diagram.

Referring now to FIGURE 1, there is shown a cathode ray tube 10 having a beam and intensity control circuit 12 coupled thereto. These elements may be of the type described in the above identified copending patent application. It is necessary only to understand that the beam and intensity control 12 operates to cause the emission of an electron beam from cathode 14 along the length of the tube toward the face of the tube. It is the function of the Horizontal Yoke 16 and the Vertical Yoke 18, each having current therethrough, for causing positioning of the electron beam. Referring briefly to FIGURE 2, wherein is illustrated an example raster, it can be seen that there are seven horizontal positions and four vertical positoins illustrated. Each of the horizontal positions is to be displaced substantially in equal amount from its adjacent beam positions. Similarly, the vertical positions are uniformly arranged. It is to be noted that the horizontal beam position spacing need not be identical with the vertical position spacing, although it may be identical if desired. This feature will be described in more detail below. Dot position 20 will be taken for illustrative purposes as the initial condition. It is the function of the circuitry, which will be described, to move the beam position along the horizontal direction, for instance ultimately to 22. The subsequent function following movement of the beam position along the horizontal path is to cause the beam to be switched back to the initial edge and move down to dot position 24. The circuitry then operates in the manner just completed to move the beam along the horizontal position ultimately ending up at position 26. The operation continues then to switch the beam back to the initial side at beam position 28 from whence it is moved in a horizontal manner to position 30. From position 30 the beam is switched down one vertical position to position 32 and thence stepped across the fact of the tube to position 34. Upon completion of the switching of the beam to position 32, the circuitry operates to position the beam again to position 20 and the cycle repeats itself. It is of course clear that the number of horizontal and vertical positions may be selected according to the needs of the system. For instance, there may be sixty-four horizontal positions and sixteen vertical positions, or forty-two horizontal positions with twelve vertical positions, or thirty-two horizontal positions and eight vertical positions. These examples are merely illustrative and as previously stated, a number of positions may be selected to fill the needs of the particular display utilization. It is of course apparent, that the raster size must be accommodated by the face of the CRT 10. As stated above, it is a primary function of this invention to assure a linearity of operation such that the distance between beam position 20 and 36, is equal to, or very nearly equal, the distance between beam position 36 and 38, and so forth across the CRT. It is critical that this interbeam position spacing be as nearly identical as possible, to assure that when a character is caused to be impressed on the face of the CRT 10 at the beam position, the intercharacter spacing will appear to be identical. As will be described below, $n$ Stages of the Horizontal stepping counter will accommodate $n+1$ beam positions, and $m$ Stages of the Vertical stepping counter will provide $m+1$ Vertical positions.

Returning now to a consideration of FIGURE 1, it can be seen that the Horizontal Yoke 16 is coupled at a center tap via conductor 40 to a potential source. In this illustrative example, the potential source is −15 volts D.C. Similarly, the Vertical Yoke 18 has its center tap coupled via wire 42 to a potential source of −15 volts DC. Horizontal Yoke 16 has a first end 44 coupled to the collector electrode of current summing amplifier QH and a second end 46 coupled to the collector electrode of current summing amplifier QH'. The base electrodes of current summing amplifiers QH and QH' are each coupled to common point 48, and thence to potential source −6 volts DC. A plurality of latched current generators (CG) are coupled as a stepping counter shown in dashed block 50 and utilized to drive the current summing amplifiers QH and QH'. FIGURE 3 is a schematic diagram of a circuit which can be utilized for the latched current generator for this invention. The latched current generator is comprised of a pair of transistors Q1 and Q2 having their respective base electrodes coupled through resistors R1 and R2 to a source of positive potential, for instance +15 volts DC, and having their collector electrodes cross coupled in a latching manner to the base drive lines. The circuit is basically in the nature of a bistable flip-flop, but is capable of providing a level of current out which exceeds that normally utilized in a flip-flop for purely logic operation. For this embodiment the emitter electrodes of each transistor are coupled to ground or a reference potential. The collector electrode of transistor Q2 is coupled to junction point 51. The signal provided on line 52 is utilized for a logical operation in gating the next adjacent stage. When the latched current generator is Cleared, a relatively high potential will be provided on line 52, since transistor Q2 is conducting. When the CG is Set, a relatively low or enabling potential, will be provided on line 52 since Q2 is off. Point 51 is also coupled through precision resistor R to the Clear Current output terminal. Transistor Q1 has its collector electrode coupled through precision resistor R' to the Set Current output terminal. A characteristic resistance value for R and R' is 80 ohms to provide a current increment of approximately 0.075 amperes. Other resistance values for R and R' provide a current increment of desired magnitude for the spacing required. The resistance value of R and R' is utilized to determine the current increment that will be added and subtracted at each end of the yokes due to swtiching the latched current generator from the Cleared to the Set states. The Clear input terminal is coupled via diode CR3, CR1, and resistor R3 to the base of transistor Q2. The arrangement of resistors is such that in the absence of a Clear pulse on the Clear input terminal transistor Q2 will have its base bias such that transistor Q2 will normally be nonconducting. Upon the application of a negative Clear pulse on the Clear input terminal, the base of transistor Q2 is caused to be biased such that the emitter-base junction is forward biased and transistor Q2 will conduct a predetermined increment of current. An AND circuit is comprised of diodes CR4 and CR5 in conjunction with resistor R6 and the −15 volts DC supply. It is necessary for pulses to be provided on both the Count input terminal and the Clock input terminal in order to cause a signal to be directed via diode CR2 and resistor R4 to the base of transistor Q1. When both signals are present, the base-emitter junction of transistor Q1 will be forward biased, thereby causing transistor Q1 to provide a predetermined increment of current. This condition is called putting the latched current generator in the Set state. It is of course understood that circuit component values must be changed to provide the necessary current increments where voltage levels to be used are different. The foregoing is merely illustrative of one type of latched current generator circuit which can be used to implement this invention. FIGURE 4 is a logic diagram symbol of the latched current generator illustrated schematically in FIGURE 3. It is comprised of a block 54 having the letters CG at the center thereof for designating Current Generator. In the logic block diagram, the designation CG will be followed by a particular stage designation reference. Block 55 represents the AND circuit of diodes CR4 and CR5, which are directed to the Set input terminal(s). A line 56 with an arrow on it is directed to the C or Clear input terminal. The "0" output terminal represents the Clear current output terminal, and the "1" represents the Set current output terminal. The "L" output terminal represents the logical signal output terminal. It will be noter that when both the Count and Clock input signals are present, the base-emitter junction of transistor Q1 will be biased such that transistor Q1 will conduct its predetermined increment of current. When transistor Q1 is caused to conduct the voltage drop across the emitter-collector electrodes will decrease. The current in the bias network coupled to the base of transistor Q2 due to the intercoupling to the collector of Q1, causes transistor Q2 to be biased to the nonconducting state. When turned off, transistor Q2 provides a relatively negative output voltage level at its collector electrode and at point 51. It can be seen therefore, that when the latched current generator is providing the Set current, a negative voltage level will be available at the logical signal output terminal "L" for gating the next stage. When the latched current generator is in the Cleared state, due to a Clear pulse having been impressed on the Clear inpue terminal, transistor Q2 will be providing its predetermined increment of current due to the forward biasing of the base-emitter junction. Similar in manner to that described above the voltage drop across the collector-emitter terminals of transistor Q2 will decrease in value as the current conduction increases. This raised potential at point 51 will cause an inactive logical signal to be provided to the logical signal output terminal "L", hence the stage to which it is coupled will be disabled.

The latched current carriers defined above are arranged in stepping counter arrangements 50 for the Horizontal Yoke drive and 58 for the Vertical Yoke drive. For this illustrative embodiment, six stages are shown for the horizontal deflection system and only three are shown for the vertical deflection system. The horizontal deflection stepping counter 50 is comprised of circuits CG–H1, CG–H2, CG–H3, CG–H4, CG–H5, and CG–H6. The six stages illustrated will provide seven horizontal positions due to the fact that the all-zero state represents one beam position. The "0" output terminal of each of the latched current generators in the horizontal stepping counter 50 are coupled to conductor 60 for directing current IH' to the emitter of transistor QH'. This coupling in effect ties each of the precision metering resistors R in common at one end. In a similar manner, the "1" output terminals of the latched current generator stages are coupled in common to conductor 62, which directs the current flow IH to the emitter electrode of current summing amplifier QH. The foregoing "0" and "1" output terminal connections can be utilized for any desired number of stages for instance $n$ stages. The vertical deflection stepping counter 58 is comprised of latched current generators CG–V1, CG–V2, and CG–V3. In a similar manner, the number of stages can be increased as desired for the number of vertical positions for instance to $m$. Again it will be noted that for the four vertical positions illustrated in FIGURE 2, only three stages are necessary since the all-zero state represents one of the vertical positions. The "0" output terminals of each of the vertical counter current generators are coupled in common to conductor 64 for directing the current increments comprising IV' to the emitter of transistor amplifier QV'. The "1" output terminals from each of the stages are directed via wire 66 to the emitter of current summing amplifier QV, for carrying current increments which comprise IV. The logical output terminal "L" of each of the stages is coupled as a gating input signal (Clock) to the next subsequent stage in all cases except the highest order stage. For instance, CG–H1 is coupled via wire 68 to the input terminal (Clock) of the AND circuit for latched current generator CG–H2. In the vertical stepping counter 58, an illustrative connection is shown from the logical output terminal of CG–V1 via conductor 70 as a gating input signal to CG–V2. The other gating interconnections shown are of an identical type and will not be described further.

In order to cause the stepping counter 50 to advance, it is necessary that a source of signals be applied. For these purposes, a square WAVE clock source 72 is shown. Such a clock source can be created by a free-running multivibrator, or a shaped crystal oscillator output. The output signal from the Clock 72 is directed via conductor 74 to the toggle input terminal T of toggle flip-flop TF–H, labelled 76. The toggle flip-flops herein described are of a type well-known in the art, and have an operation such that a recurring signal of similar characteristic at the toggle input terminal causes the state of the output signals at terminals $\phi 1$ and $\phi 2$ to alternate between active and inactive respectively, even though the input signal is identical. The $\phi 1$ output terminal is coupled to AND circuit 78, and the $\phi 2$ output terminal is coupled to AND circuit 80. The AND circuits may be of any type well known in the art, wherein it is necessary that two or more signals of the same characteristic must be present at the input terminals in order for the same signal characteristic to be provided at its output terminal. The output terminal of AND circuit 78 is coupled via wire 82 to a buss distribution system for directing the $\phi 1$ signal to the Count input terminals of current latching circuits CG–H1 via conductor 82–1, CG–H3 via conductor 82–3, and CG–H5 via conductor 82–5. In a similar manner, the alternate phase is derived from AND circuit 80, and is directed on conductor 84 to a grouping of the current generators. The signal is directed to current generator CG–H2 via conductor 84–2, to CG–H4 via conductor 84–4 and to CG–H6 via conductor 84–6. A buss connection is made via signal buss 86 to the Clear input terminals of each of the current generators.

The output signal from Clock 72 is also directed to a Flyback Delay circuit 88 via conductor 90. The Flyback Delay may be of a well-known delay line type or of any other well-known means of providing a signal delay. The function is to provide a period in which the electron beam may be switched from one edge of the raster to the origin edge before starting the horizontal stepping of the electron beam across the face of the CRT. A horizontal control flip-flop FF–H is utilized to enable the switching of the horizontal stepping counter 50 and to clear the latched current generator stages at the appropriate time. A flip-flop may be any of a well-known bistable multivibrator type. Operation is such that when an input signal is received on the S input terminal the flip-flop is in the Set condition, thereby causing a logical "1" signal to be provided on the "1" output terminal and a "0" output signal on the "0" output terminal. The alternative case is such that when an active signal is provided on the Clear (C) input terminal a logical "1" signal is caused to be provided on the "0" output terminal and a "0" is caused to be provided on the "1" output terminal. The latter state is said to be the Cleared flip-flop state. The clock signal derived from the Flyback Delay circuit 88 is directed via conductor 92 to OR circuit 94. OR circuit 94 has the logical operation such that when a "1" signal is present on either or both of its input terminals, a logical "1" signal will be provided on conductor 96 to the Set input terminal of FF–H. Therefore, when the activation excursion of clock signal derived from Clock 72 is passed through the Flyback Delay 88 and through OR circuit 94, the activating signal on wire 96 will cause FF–H to be Set, thereby providing a "1" output signal on conductor 98 which is utilized to enable AND circuits 78 and 80. When the enable signals are present on wire 98, AND circuit 78 and 80 are in a condition such that they will pass the alternating phases from TF–H to the respective stages of the stepping counter 50. The "0" output terminal of FF–H is coupled via conductor 100 to OR circuit 102. When the signal on wire 100 indicates that FF–H is cleared, OR circuit 102 will pass a "1" signal to buss 86, thereby causing each stage of stepping counter 50 to be cleared. When the counter has stepped through all stages, and latching current generator CG–H6 has been Set; the logic output terminal provides a signal on conductor 104 which is directed through Delay circuit 105 to the Clear input terminal of FF–H thereby causing FF–H to be cleared. Delay 105 is utilized to provide a time between setting of CG–H6 and clearing of the whole stepping counter. The "0" output terminal of FF–H is also coupled via conductor 106 to the toggle input terminal T of toggle flip-flop TF–V, labeled 108. It is the function of the pulse received on line 106 to provide the clocking signal for the vertical stepping counter 58. This function will be described in more detail below. The control flip-flop for the vertical circuitry is designated FF–V. This flip-flop is a bistable multivibrator similar to that described for the horizontal beam positioning circuitry. The clock pulses directed from Clock 72 via conductor 110 through OR circuit 112 to the Set input terminal of FF–V via wire 114 operate to put FF–V in the Set state, thereby producing a "1" output signal at the "1" output terminal to AND circuits 116 and 118. In response to the pulses received on conductor 106 TF–V operates to provide alternately active signals on the $\phi 1'$ output terminals and the $\phi 2'$ output terminals. AND circuit 116 receives input signals via conductor 120 from the $\phi 1'$ output terminal while AND circuit 118 receives input signals via conductor 122 from the $\phi 2'$ output terminals. The output terminal of AND circuit 116 is coupled to the Set input terminal of latched current generator circuits CG–V1 and CG–V3 via path 124. AND circuit 118 has its output terminal coupled to the input terminal of CG–V2 via wire 126. It is to be noted here as was described above, that each phase clocking signal is directed to alternate stages of the respective stepping counter circuits. The logic output terminal of CG–V3 is coupled to the Clear input terminal of FF–V through conductor 128, thereby causing FF–V to be Cleared each time the stepping counter 58 has been sequenced through a full chain of count signals. The "0" output terminal of FF–V is coupled through OR circuit 130 via conductor 132, and thence to the Clear buss 134. The Clear buss is coupled to each Clear input terminal of the vertical stepping counter 58.

In order to initiate the system operation, a source of Master Clear pulse 136 is utilized. This can be either a manually operated push button which provides a Clear voltage level or may be operated by control logic in the CRT system for initializing the beam deflection circuitry. A Master Clear pulse is provided on conductor 138 to enable the initiation of clock pulses from Clock 72. The Master Clear pulse is also applied to OR circuit 94 via conductor 140 for causing FF–H to be put in the Set condition. Similarly, the Master Clear pulse is applied via conductor 142 to OR circuit 102 for causing each stage of stepping counter 50 to be put in the Cleared condition. Finally, for the horizontal circuitry, the Master Clear pulse is applied via conductor 144 to the Clear input terminal of toggle flip-flop TF–H causing it to be switched to the clear state such that an application of the clock pulse from Clock 72 will cause the state to be switched to provide a "1" signal at output terminal $\phi1$. In the vertical beam positioning circuitry, the Master Clear pulse is provided via 146 to the Clear terminal of toggle flip-flop TF–V for causing it to be switched in a manner similar to that just described; via conductor 148 to OR circuit 112 for causing flip-flop FF–V to be Set; and via conductor 150 to OR circuit 130 for causing each stage of the stepping counter 58 to be Cleared. It will be noted that "1" and "0" have been referred to in the foregoing. This is merely a convenient way of referring to logical signal levels that are active and inactive respectively and no particular significance is attached to the particular designation.

OPERATION

Having set forth the circuitry and the logical interconnections for the horizontal and vertical electron beam positioning circuitry, the mode of operation will be considered at this time. In this discussion, attention will be directed to the signal combinations illustrated in FIGURE 5. At the outset, the Master Clear pulse is applied from the Master Clear pulse source 136 to initially Set the horizontal control flip-flop FF–H and the vertical control flip-flop FF–V. The Master Clear pulse also operates to Clear stepping counter 50 and the stepping counter 58. Finally, the Master Clear pulse is utilized to initialize the TF–H and TF–V. The Clock 72 is also gated on by the Master Clear pulse. Having initiated the Clock, toggle flip-flop TF–H is caused to switch such that the first $\phi1$ pulse 200 is directed through AND circuit 78 onto line 82. It will be noted that there is only a single input via wire 82–1 to CG–H1. This $\phi1$ pulse will cause CG–H1 to switch to the Set state, thereby removing the increment of current from the "0" output terminal and adding the increment of current to the "1" output terminal. Referring to the Horizontal Deflection plot of units of current, it will be noted that in the initial condition the current flowing for the Horizontal Yoke is at a maximum in the IH' line and is at a minimum in the IH line, thereby causing the horizontal beam position to be at point 20 as shown in FIGURE 2. Similarly, the current in the Vertical Yoke will be such that the IV' current is at a maximum and IV current is essentially zero. It is the combination of these two currents in their respective yokes which operates to position the electron beam. As just described, the occurrence of the first $\phi1$ pulse 200 will cause the IH' total current to be reduced by one unit of current since the stage CG–H1 has been switched. This same unit of current will be added in the IH current line. Since the currents are both directed into the respective ends of Horizontal Yoke 16, the net effect will be to cause an electromagnetic field which will shift the electron beam to horizontal position 36. Having Set stage CG–H1, line 68 will carry an active logic signal as one input to the Set input terminal of CG–H2. Then upon the occurrence of the next subsequent clock signal from Clock 72 to the T input terminal of TF–H, a $\phi2$ pulse 202 will be provided to AND circuit 80, and directed to the Set input terminals of all alternate stages in the stepping counter 50. Since only stage CG–H1 has been Set, only stage CG–H2 will have its Set input terminal enabled by a signal on the Count terminal, thereby allowing it to be Set by the occurrence of the first $\phi2$ pulse 202. All other stages are deactivated or inhibited, since the gating stages are Cleared at this time. At this point it can be pointed out that it is the necessity of having alternate phase clock pulses to prevent run away in the stepping counters 50 and 58 upon the application of a count pulse. It can be seen that when a pulse is applied to the Set input terminal, there is only the delay of the circuit in switching until the enabling signal is available at the logic output terminal for the next stage. Since reliable operation requires that the clocking signal be of a duration long enough to assure switching, it would be likely that the enable signal (count) to the next subsequent stage would be available prior to the termination of the clock signal. Therefore, if the same clock signal were applied to all stages it can be seen that there would be the problem of the pulse propagating down the chain during a single input clock pulse. This problem is alleviated by alternating the stages to be clocked by alternate clock phase pulses. Again, referring to the horizontal deflection plot of IH and IH' currents, it can be seen that by switching CG–H2 an increment of current is deleted from the IH' total and an increment of current is added to the IH current total. It follows, therefore, that there are now two increments in the IH current and IH' has been reduced to four increments of current. The net effect of these two currents flowing in the respective ends of Horizontal Yoke 16 is to cause the electron beam to be moved to horizontal position 38. The occurrence of the next clock pulse from clock source 72 causes toggle flip-flop TF–H to again switch so that $\phi1$ is providing a pulse. Since only CG–H3 of the previously Cleared stages is enabled to count, it will be caused to switch in a manner similar to that just described. The resultant deflection currents are shown at Beam Position 3 in FIGURE 5. The next occurrence of the clock pulse causes toggle flip-flop TF–H to be switched to the $\phi2$ output condition and results in a balanced condition such that IH is substantially equal to IH'. Under these conditions, the electron beam is centered at the center of the CRT. Subsequent occurrences of the clock pulses from Clock 72 cause the remainder of the stages to be Set in sequence as previously described with the IH and IH' current totals being as shown for Beam Positions 4, 5, 6, and 7. When stage CG–H6 has become Set, the electron beam has been positioned to point 22 in the illustrative raster of FIGURE 2. This also results in the logical output signal being active for providing a signal on line 104 to the Clear input terminal of the horizontal control flip-flop. Clearing the horizontal control flip-flop FF–H results in a Clear signal being provided on line 100 through OR circuit 102 to the horizontal stepping counter 50. Referring again to the Horizontal Deflection current plot of FIGURE 5, it can be seen that at this point the IH' current is raised to a maximum and the IH current is dropped to a minimum through the switching of all of the latched current generators in stepping counter 50 from the Set to the Cleared state. This causes the electron beam to be moved from point 22 toward the origin side of the raster. Simultaneously, the Clear signal provided by control flip-flop FF–H is directed via conductor 106 to the toggle input terminal of TF–V. It will be recalled that toggle flip-flop TF–V was initialized such that $\phi2'$ was active. The occurrence of the pulse on line 106 causes TF–V to switch such that $\phi1'$ provides a "1" output signal. It will also be recalled that vertical controlled flip-flop FF–V was Set by the Master Clear pulse so that AND circuit 116 is enabled. The occurrence of the $\phi1'$ pulse causes a pulse to be passed through AND circuit 116 and directed to the Set input terminal of the associated stepping counter circuits. Since all of the latched current generators of the vertical stepping counter 58 are Cleared prior to this point, only CG–V1 is in a condition capable of being set by the $\phi1'$ pulse. In response to such pulse it is Set, thereby reducing the IV' current by one current increment and increasing the IV current by one current increment. This plot would be similar to that shown for Horizontal Deflection. At this point, it will be noted that the net effect in the Vertical Yoke 18 in combination with the current combination just described in the Horizontal Yoke 16 results in the electron beam being positioned to position 24 of the raster in FIGURE 2. It should be noted that the Flyback Delay circuit 88 results in a delayed application of the next subsequent clock pulse from Clock 72 which is utilized to Set the horizontal control flip-flop FF–H. This is a period sufficient to allow the electron beam to move from point 22 to point 24 and to allow the circuits to settle. The IV and IV' currents will be held constant throughout the next sequence of clock pulses to the horizontal circuitry until such time as all of the stages of the horizontal stepping counter 50 have again been Set as previously described. At that point, the horizontal control flip-flop FF–H will again be Cleared causing the stages of the stepping counter 50 to be Cleared and again providing a pulse on conductor 106 to the toggle input of TF–V. This will result in a "1" signal being provided on conductor 122 to AND circuit 118 and thence to the input terminal of CG–V2. Since CG–V1 was previously Set, an enable signal is provided on line 70, thereby permitting CG–V2 to be Set. The setting of CG–V2 again alters the IV current by one increment and decreases the IV' current by one increment. At this time, the electron beam has been switched from point 26 on the raster back to point 28. Following the next total sequence of counting up the horizontal stepping counter and ultimately causing stage CG–V3 to be Set, the vertical control flip-flop FF–V will be caused to be Cleared by the pulse applied on line 128. The clearing of FF–V results in a "1" output signal from the "0" output terminal through OR circuit 130 to the Clear buss 134. This pulse results in each of the stages of the vertical stepping counter 58 to be Cleared in a manner similar to that described for the horizontal stepping counter 50. At this point, the current sums in the IV and IV' lines will be exchanged in a manner similar to that shown for the IH and IH' lines. The net effect of the switched current values is to move the electron beam to vertical position 20. At this time, the next subsequent clock pulse will reinitiate the entire sequence of events as described above.

SUMMARY

It can be seen from the foregoing that each beam position on the horizontal line and each vertical position is determined respectively by switching a single latched current generator. Therefore, the spacing variation between any two positions due to the difference in current increments from stage to stage will be no greater than the variation in current from the single latched current generator. That is, the output current variations will not accumulate and appear as a gross spacing error at one beam position on the raster as many prior art systems do. The use of push-pull circuitry prevents a trapezoidal shaped raster by balancing the changes in the current summing amplifiers as current increments are added and subtracted. It can be seen that any circuit tolerance difference as well as the differences in voltage drops across the current summing amplifiers will be compensated for by balancing changes in the other half of the driving circuitry. Further, it can be seen that the circuitry is comprised of relatively inexpensive components without the need of expensive voltage or current regulators as are required in prior art systems.

Having now, therefore, fully disclosed and described an embodiment of the subject invention, it being understood that modifications can be made within the spirit and scope of this invention, what is intended to be protected by Letters Patent is set forth in the appended claims.

What is claimed is:

1. For use in an electromagnetic electron beam positioning system, beam positioning circuitry including: a push-pull deflection yoke having first and second end-terminals and a center-terminal for coupling to a source of potential, said yoke for cooperating with a cathode ray tube; a plurality of latched current generators intercoupled as a stepping counter, each of said current generators having Set and Clear input terminals for receiving Set and Clear signals respectively and Set and Clear output terminals, and responsive to said Set signals received on said Set input terminals for providing a predetermined increment of current at said Set output terminal and substantially no current at said Clear output terminal, and responsive to said Clear signals received on said Clear input terminal for providing a predetermined increment of current at said Clear output terminal and substantially no current at said Set output terminal; clocking means coupled to said Set input terminals for causing said latched current generators to be set in a predetermined stepping count order; first current summing means having first input means coupled to each of said Set output terminals and having first output means coupled to said first end-terminal for providing a first sum of current to said deflection-yoke indicative of the number of said latched current generators that are Set; second current summing means having second input means coupled to each of said Clear output terminals and having second output means coupled to said second end-terminal for providing a second sum of current to said deflection yoke indicative of the number of said latched current generators that are Clear, the net effect of said first and second current sums operative to define a predetermined location of the electron beam in said cathode ray tube; and clearing means coupled to said Clear input terminals for clearing said latched current generators.

2. Beam positioning circuitry as in claim 1 wherein each of said plurality of latched current generators further includes a logical signal output terminal for providing a gating signal when said latched current generator is Set, gating means coupled to said Set input terminals, said gating means having a plurality of input terminals, and means for coupling said logic signal output terminal, except the last one, to one of said input terminals of the next adjacent one of said latched current generators for enabling said latched current generators to be Set in a predetermined order in response to signals received from said clocking means.

3. Beam positioning circuitry as in claim 2 wherein said clocking means includes a source of recurrent clock signals; switching means having an input terminal coupled to said source and having two output terminals, means including circuit means for alternately providing count signals at each of said two output terminals in response to said clock signals; first gate means coupled to one of said two output terminals, said first gate means including a first gating output terminal, first count-coupling means for coupling said first gating output terminal to a first predetermined group of said input terminals on said latched current generators; second gate means coupled to the other of said two output terminals, said second gate means including a second gating output terminal, second count-coupling means for coupling said second gating output terminal to a second predetermined group of said gating input terminals on said latched current generators, said first and second predetermined groups of latched current generators having count signals alternately applied thereto as said switching means is caused to switch by said source of clock signals.

4. Beam positioning circuitry as in claim 3 wherein said clearing means includes positioning control means having a clearing-control input terminal, a set-control input terminal, a clearing-control output terminal, and a set-control output terminal; first coupling means for coupling said logic signal output terminal of the last one of said latched current generators to said clearing-control input terminal, said positioning control means being conditioned to a first operative condition in response to an active signal thereon; second coupling means for coupling said clearing-control output terminal for each of said Clear input terminals of said latched current generators for causing each of said latched current generators to be cleared in response to the logic signal provided at said logic signal output terminal, thereby causing the electron beam to be positioned toward its initial position; third coupling means for coupling said set-control input terminal to said source of recurrent signals for causing said positioning control means to be conditioned to a second predetermined operating condition; and fourth coupling means for coupling said set-control output terminal to said first and second gate means for providing enabling signals thereto when said positioning control means is in said second predetermined operating condition and for providing disabling signals thereto when said positioning control means is in said first operating condition.

5. An electromagnetic electron beam positioning system for use with a cathode ray tube comprising: a first push-pull deflection yoke having first and second end-terminals and a first center-terminal for coupling to a source of potential, said first push-pull deflection yoke for cooperating with a cathode ray tube to cause positioning of the electron beam along a first axis; a second push-pull deflection yoke having third and fourth end-terminals and a second center-terminal for coupling to a source of potential, said second push-pull deflection yoke for cooperating with a cathode ray tube to cause positioning of the electron beam along a second axis; first and second current summing amplifiers coupled respectively to said first and second end-terminals for providing first and second current sums to said first push-pull deflection yoke, the net effect of said first and second current sums being to define a discrete beam position along said first axis; third and fourth current summing amplifiers coupled to said third and fourth end-terminals for providing third and fourth current sums to said second push-pull deflection yoke, the net effect of said third and fourth current sums being to define a discrete beam position along said second axis; a first stepping counter having first and second means for providing first and second pluralities of current increments respectively, said first and second means coupled to said first and second current summing amplifiers respectively; a second stepping counter having third and fourth means for providing third and fourth pluralities of current increments respectively, said third and fourth means coupled to said third and fourth current summing amplifiers respectively; control means coupled to said first and second stepping counters for causing said first and second stepping counters to alter said first, second, third, and fourth pluralities of current increments in a predetermined order, thereby effectively positioning said electron beam along said first and second axis.

6. A system as in claim 5 wherein said first stepping counter comprises $n$-stages for defining $n+1$ electron beam positions along said first axis, where $n$ is an integer greater than 1, and wherein said second stepping counter comprises $m$-stages for defining $m+1$ electron beam positions along said second axis, where $m$ is an integer greater than one, each of said stages including a latched current generator means having a gated-set input terminal, a Clear input terminal, a Set output terminal, a Clear output terminal, and a logic-signal output terminal, said latched current generator means including current means responsive to a first activating signal on said Set input terminal for providing a first predetermined increment of current on said Set output terminal and responsive to a second activating signal on said Clear output terminal for providing a second predetermined increment of current on said Clear output terminal, and logic means coupled to said current means for providing a first predetemined logic signal at said logic-signal output terimnal in response to said first activating signal received on said Set input terminal, and a second predetermined logical signal at said logic-signal output terminal in response to said second activating signal received on said Clear input terminal; and coupling means for coupling said logic-signal output terminal of each of said stages, except the $n$th stage, to said gated-set input terminal of the next adjacent stage, said first predetermined logical signal for a given one of said stages enabling setting of the associated one of said stages upon occurrence of one of said first activating signals, and said second logical signal for said given one of said stages inhibiting setting of the associated one of said stages upon occurrence of said first activating signal, the number of increments of current applied to said first and second summing amplifiers depending on the number of said $n$-stages providing current increments on said Set output terminals and a number of $n$-stages providing current increments on said Clear output terminals respectively, and the number of increments of current applied to said third and fourth summing amplifiers depending on the number of said $m$-stages providing current increments on said Set output terminals and the number of said $m$-stages providing current increments on said Clear output terminals respectively.

7. A system as in claim 6 wherein said control means includes a source of recurrent count signals; first switching means responsively coupled to said source, said first switching means having first and second counting output terminals and including first circuit means for alternately providing count signals at said first and second counting output terminals in response to said recurrent signals; first count-coupling means for coupling said first counting output terminal to a first predetermined group of said gated-set input terminals in said first stepping counter; and second count-coupling means for coupling said second counting output terminal to a second predetermined group of said gated-set input terminals in said first stepping counter, said first and second predetermined groups each comprised of non-adjacent ones of said stages.

8. A system as in claim 7 wherein said control means further includes second switching means responsively coupled to said logic-signal output terminal of said $n$th stage, said second switching means having third and fourth counting output terminals and including second circuit means for alternately providing count signals at said third and fourth counting output terminals in response to said first predetermined logical signal; third count-coupling means for coupling said third counting output terminal to a first predetermined group of said gated-set input terminals in said second stepping counter; and fourth count-coupling means for coupling said fourth counting output terminal to a second predetermined group of said gated-set input terminals in said second stepping counter, said first and second predetermined groups in said second stepping counter each comprised of non-adjacent ones of said stages, said second stepping counter being advanced one step each time said first stepping counter has been advanced $n$ times.

9. A system as in claim 8 wherein said control means further includes first beam positioning control means coupled to said first and second count-coupling means for enabling the transfer of count signals to said first and second predetermined groups in said first stepping counter, said first beam positioning means including input means responsively coupled to said first stepping counter for disabling said first and second count-coupling means when said first stepping counter has been advanced $n$ times; and second beam positioning control means coupled to said third and fourth count-coupling means for enabling the transfer of count signals to said first and second predetermined groups in said second stepping counter, said second beam positioning means including input means responsively coupled to said second stepping counter for disabling said first and second count-coupling means when said second stepping counter has been advanced $m$ times.

10. A system as in claim 9 and further including first clearing means coupled to said Clear input terminals in said first stepping counter for clearing said first stepping counter when said $n$th stage has been Set; and second clearing means coupled to said Clear input terminals of said second stepping counter for clearing said second stepping counter when said $m$th stage has been Set.

References Cited

UNITED STATES PATENTS

| 2,810,860 | 10/1957 | Mork | 315—27 |
| 3,116,436 | 12/1963 | Sweeney | 315—18 |
| 3,325,803 | 6/1967 | Carlock et al. | 340—324.1 |

OTHER REFERENCES

R. K. Richards, Arithmetic Operations in Digital Computers, D. Van Nostrand (1955), pp. 207, 208.

RODNEY D. BENNETT, *Primary Examiner.*

CHARLES L. WHITHAM, *Assistant Examiner.*